United States Patent
Kang et al.

(10) Patent No.: US 9,601,750 B2
(45) Date of Patent: Mar. 21, 2017

(54) SURFACE-TREATED ELECTRODE ACTIVE MATERIAL, METHOD OF SURFACE TREATING ELECTRODE ACTIVE MATERIAL, ELECTRODE, AND LITHIUM SECONDARY BATTERY

(75) Inventors: Yoon-sok Kang, Seongnam-si (KR); Jun-young Mun, Seoul (KR); Jin-hwan Park, Seoul (KR); Min-sik Park, Suwon-si (KR); Seung-mo Oh, Seoul (KR); Tae-ho Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1030 days.

(21) Appl. No.: 13/572,084

(22) Filed: Aug. 10, 2012

(65) Prior Publication Data

US 2013/0149610 A1 Jun. 13, 2013

(30) Foreign Application Priority Data

Dec. 12, 2011 (KR) .................. 10-2011-0133047

(51) Int. Cl.
*H01M 4/131* (2010.01)
*H01M 4/36* (2006.01)
(Continued)

(52) U.S. Cl.
CPC .......... *H01M 4/131* (2013.01); *H01M 4/366* (2013.01); *H01M 4/505* (2013.01);
(Continued)

(58) Field of Classification Search
CPC ...... H01M 4/131; H01M 4/505; H01M 4/366; H01M 10/052; Y02T 10/7011; Y02E 60/122
See application file for complete search history.

(56) References Cited

U.S. PATENT DOCUMENTS 3,703,412 A 11/1972 Levine
4,965,244 A * 10/1990 Weaver ............... C23C 14/0021
427/62

(Continued)

FOREIGN PATENT DOCUMENTS

CN 001482700 A 3/2004
CN 101373831 A 2/2009
(Continued)

OTHER PUBLICATIONS

Wehner et al. (Journal of Catalysis vol. 88 pp. 246-248 1984—first page only).*

(Continued)

*Primary Examiner* — Patrick Ryan
*Assistant Examiner* — Aaron Greso
(74) *Attorney, Agent, or Firm* — Cantor Colburn LLP

(57) ABSTRACT

A surface-treated electrode active material, a method of surface treating an electrode active material, an electrode, and a lithium secondary battery. The surface-treated electrode active material includes a surface metal oxide layer having higher degree of reduction of a metal than that of a bulk metal oxide layer. The method includes: forming a mixture by adding an untreated electrode active material comprising a metal oxide, and at least one of a basic material and a reducing material to a solvent; and stirring the mixture.

18 Claims, 9 Drawing Sheets

(51) Int. Cl.
 *H01M 4/505* (2010.01)
 *H01M 10/052* (2010.01)

(52) U.S. Cl.
 CPC .......... *H01M 10/052* (2013.01); *Y02E 60/122* (2013.01); *Y02T 10/7011* (2013.01)

(56) References Cited

U.S. PATENT DOCUMENTS

| | | | |
|---|---|---|---|
| 7,348,100 | B2 | 3/2008 | Adamson et al. |
| 9,466,856 | B2 | 10/2016 | Cho et al. |
| 2003/0180615 | A1* | 9/2003 | Johnson ............ C01G 45/1242 429/231.1 |
| 2004/0093791 | A1 | 5/2004 | Finkelshtain et al. |
| 2007/0111098 | A1 | 5/2007 | Yang Kook et al. |

FOREIGN PATENT DOCUMENTS

| | | |
|---|---|---|
| CN | 101499527 A | 8/2009 |
| CN | 101508431 A | 8/2009 |
| CN | 101694893 A | 4/2010 |
| CN | 101800310 A | 8/2010 |
| JP | 49100050 | 9/1974 |
| JP | 60-170162 A | 9/1985 |
| JP | 62-105364 A | 5/1987 |
| KR | 2002-0036284 | 5/2002 |
| KR | 10-2004-007356 | 1/2004 |
| KR | 10-2005-0048453 | 5/2005 |
| KR | 10-2008-0037525 A | 4/2008 |

OTHER PUBLICATIONS

US Publication No. US 2007/0111098 A1 (AB) is substantially equivalent to Korean Publication No. 10-2004-0007356 (AD).

* cited by examiner

SURFACE-TREATED ELECTRODE ACTIVE MATERIAL, METHOD OF SURFACE TREATING ELECTRODE ACTIVE MATERIAL, ELECTRODE, AND LITHIUM SECONDARY BATTERY

CROSS-REFERENCE TO RELATED APPLICATION

This application claims the benefit of Korean Patent Application No. 10-2011-0133047, filed on Dec. 12, 2011 in the Korean Intellectual Property Office, the disclosure of which is incorporated herein in its entirety by reference.

BACKGROUND OF THE INVENTION

1. Field of the Invention

Aspects of the present invention relate to a surface-treated electrode active material, a method of surface treating an electrode active material, and an electrode and a lithium secondary battery including the electrode active material, and more particularly, to a surface-treated electrode active material including a surface metal oxide layer having higher degree of reduction of metal than a bulk metal oxide layer, a method of surface treating an electrode active material, an electrode including the surface-treated electrode active material, and a lithium secondary battery including the electrode.

2. Description of the Related Art

Lithium secondary batteries have been used as power supply sources of many mobile devices due to their high energy densities and easy designs. Recently, as lithium secondary batteries are used as power supply sources for electric cars and for power storage devices in addition to portable information technology (IT) devices, studies on materials having high energy densities and long lifetimes have increased. Here, coating a material on a surface of an electrode active material is an effective method of improving performance by modifying the electrode active material with a relatively simple process by using a well-known electrode active material.

Various methods of coating an inorganic material on a surface of an electrode active material are known to improve the performance of a battery. Examples of the inorganic material include metal oxides and fluorides, such as aluminum oxide ($Al_2O_3$), magnesium oxide (MgO), zinc oxide (ZnO), aluminum fluoride ($AlF_3$), zinc fluoride ($ZnF_2$), and magnesium fluoride ($MgF_2$).

Coating a material on the surface of the electrode active material largely has two effects: preventing of a side reaction generated due to electron transfer as an electrolyte directly contacts the surface of the electrode active material and removing of by-products that are generated during charging and discharging of a battery that degrades cell performance.

As requirements for high energy density have increased recently, studies on an electrode active material for high voltage are being performed. However, additional studies are required to develop a coating material that suppresses oxidation of an electrolyte on a surface of the electrode active material, where the oxidation is inevitably generated under high voltage conditions. Also, unlike batteries for mobile devices, batteries for electric cars and power storage devices need to operate and be stored in places where the external temperature is high, and the temperature thereof may easily increase due to instant charging and discharging. Accordingly, such batteries need to satisfactorily operate and store energy even at a high temperature.

SUMMARY OF THE INVENTION

Aspects of the present invention provide surface-treated electrode active materials including a surface metal oxide layer having higher degree of reduction of a metal than a bulk metal oxide layer.

Aspects of the present invention provide methods of surface treating an electrode active material.

Aspects of the present invention provide electrodes including the surface-treated electrode active materials.

Aspects of the present invention provide lithium secondary batteries including the electrodes.

According to an aspect of the present invention, a surface-treated electrode active material includes: a bulk metal oxide layer including n types of metal elements, wherein n is a natural number of 2 or above; and a surface metal oxide layer including the same n types of metal elements as those of the bulk metal oxide layer, wherein the degree of reduction $[M^{q+}/M^{p+}]_{surface}$ (wherein M is a metal element, and p and q are respectively an integer equal to or higher than 0 and p>q) of the metal element included in the surface metal oxide layer is higher than the degree of reduction $[M^{q+}/M^{p+}]_{bulk}$ (wherein M is a metal element, and p and q are respectively an integer equal to or higher than 0 and p>q) of a corresponding metal element included in the bulk metal oxide layer.

According to an aspect of the present invention the metal element is manganese (Mn). When M is Mn, p is 4, and q is 3, $[M^{q+}/M^{p+}]_{bulk}$ may be from 0 to about 0.1 and $[M^{q+}/M^{p+}]_{surface}$ may be from about 0.1 to about 0.5.

According to another aspect of the present invention, a method of surface treating an electrode active material, the method includes: forming a mixture by adding an untreated electrode active material including a metal oxide, and at least one of a basic material and a reducing material to a solvent; and stirring the mixture. If the reducing material is not added to the mixture, the pH of the mixture after the stirring may be from about 8 to about 14. If both the basic material and the reducing material are added to the mixture, the pH of the mixture after the stirring may be from about 8 to about 14. If the basic material is not added to the mixture, the pH of the mixture after the stirring may be from about 2 to about 6, i.e., acidic, or from about 7 to about 10, i.e., basic.

The metal oxide may include manganese (Mn).

The basic material may include at least one type of compound selected from the group consisting of KOH, LiOH, NaOH, $Mg(OH)_2$, pyridine, ammonia, acetylacetone, and $Ba(OH)_2$.

The reducing material may include at least one type of compound selected from the group consisting of sodium amalgam, a sulfite compound, hydrazine, iron(II) sulfate, a Lindlar catalyst, $LiAlH_4$, hydrogen, ascorbic acid, oxalic acid, formic acid, $NaBH_4$, tin chloride, and phosphonic acid.

The method may further include, after the stirring, obtaining a solid body by filtering the mixture, cleaning the solid body, and drying the cleaned solid body. The drying may be performed at a temperature from about 20 to about 80° C. under a pressure below atmospheric pressure.

Additional aspects and/or advantages of the invention will be set forth in part in the description which follows and, in part, will be obvious from the description, or may be learned by practice of the invention.

According to another aspect of the present invention, an electrode includes the surface-treated electrode active material. According to another aspect of the present invention, a lithium secondary battery includes the electrode. The electrode may be a cathode.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
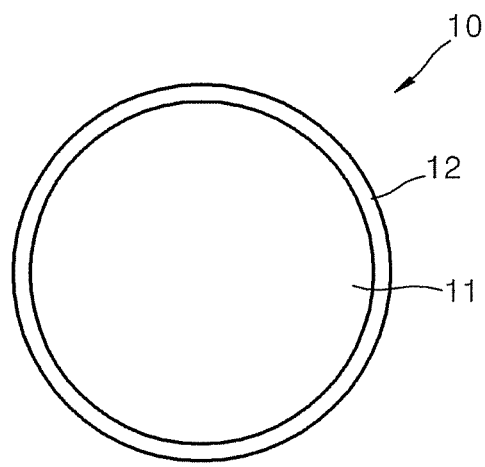
FIG. 1 is a cross-sectional view of a surface-treated electrode active material according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. As used herein, the term "and/or" includes any and all combinations of one or more of the associated listed items. Expressions such as "at least one of," when preceding a list of elements, modify the entire list of elements and do not modify the individual elements of the list.

FIG. 1 is a cross-sectional view of a surface-treated electrode active material 10 according to an embodiment of the present invention. The surface treated electrode device 10 includes a bulk metal oxide layer 11 and a surface metal oxide layer 12. In the present embodiment, the surface-treated electrode active material 10 is a cathode active material for a lithium secondary battery, but alternatively, the surface-treated electrode active material 10 may be an anode active material for a lithium secondary battery, or a cathode or anode active material for another battery.

The bulk metal oxide layer 11 includes n types of metal elements, wherein n is a natural number of 2 or above. The metal elements may be selected from the group consisting of cobalt (Co), manganese (Mn), nickel (Ni), aluminum (Al), chromium (Cr), iron (Fe), magnesium (Mg), strontium (Sr), vanadium (V) titanium (Ti), molybdenum (Mo), rare earth metals, and copper (Cu).

The bulk metal oxide layer 11 may be a compound expressed by any one of the formulas $Li_aA_{1-b}L_bD_2$ ($0.90 \leq a \leq 1.8$ and $0 \leq b \leq 0.5$); $Li_aE_{1-b}L_bO_{2-c}D_c$ ($0.90 \leq a \leq 1.8$, $0 \leq b \leq 0.5$, and $0 \leq c \leq 0.05$); $LiE_{2-b}L_bO_{4-c}D_c$ ($0 \leq b \leq 0.5$ and $0 \leq c \leq 0.05$); $Li_aNi_{1-b-c}Co_bL_cD_\alpha$ ($0.90 \leq a \leq 1.8$, $0 \leq b \leq 0.5$, $0 \leq c \leq 0.05$, and $0 < \alpha \leq 2$); $Li_aNi_{1-b-c}Co_bL_cO_{2-\alpha}T_\alpha$ ($0.90 \leq a \leq 1.8$, $0 \leq b \leq 0.5$, $0 \leq c \leq 0.05$, and $0 < \alpha < 2$); $Li_aNi_{1-b-c}Co_bL_cO_{2-\alpha}T_2$ ($0.90 \leq a \leq 1.8$, $0 \leq b \leq 0.5$, $0 \leq c \leq 0.05$, and $0 < \alpha < 2$); $Li_aNi_{1-b-c}Mn_bL_cD_\alpha$ ($0.90 \leq a \leq 1.8$, $0 \leq b \leq 0.5$, $0 \leq c \leq 0.05$, and $0 < \alpha \leq 2$); $Li_aNi_{1-b-c}Mn_bL_cO_{2-\alpha}T_\alpha$ ($0.90 \leq a \leq 1.8$, $0 \leq b \leq 0.5$, $0 \leq c \leq 0.05$, and $0 < \alpha < 2$); $Li_aNi_{1-b-c}Mn_bL_cO_{2-\alpha}T_2$ ($0.90 \leq a \leq 1.8$, $0 \leq b \leq 0.5$, $0 \leq c \leq 0.05$, and $0 < \alpha < 2$); $Li_aNi_bE_cG_dO_2$ ($0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$, and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above formulas, A is Ni, Co, Mn, or a combination thereof; L is Al, Ni, Co, Mn, Cr, Fe, Mg, Sr, V, a rare earth element, or a combination thereof; D is O, F, S, P, or a combination thereof; E is Co, Mn, or a combination thereof; T is F, S, P, or a combination thereof; G is Al, Cr, Mn, Fe, Mg, La, Ce, Sr, V, or a combination thereof; Q is Ti, Mo, Mn, or a combination thereof; Z is Cr, V, Fe, Sc, Y, or a combination thereof; and J is V, Cr, Mn, Co, Ni, Cu, or a combination thereof.

The surface metal oxide layer 12 includes the same n types of metal elements as those of the bulk metal oxide layer 11. In other words, the surface metal oxide layer 12 may be obtained by surface treating an untreated electrode active material having the same composition as that of the bulk metal oxide layer 11 by using the method described below.

The degree of reduction $[M^{q+}/M^{p+}]_{surface}$ (wherein p and q are respectively an integer equal to or higher than 0 and $p>q$) of the metal element M included in the surface metal oxide layer 12 is higher than the degree of reduction $[M^{q+}/M^{p+}]_{bulk}$ (wherein p and q are respectively an integer equal to or higher than 0 and $p>q$) of the corresponding metal element M included in the bulk metal oxide layer 11. As such, by including the surface metal oxide layer 12 having a higher degree of reduction of the metal element M than the bulk metal oxide layer 11, the surface-treated electrode active material 10 may have excellent lifetime characteristics at a high temperature, which is described below. Also, since the surface metal oxide layer 12 completely surrounds the bulk metal oxide layer 11, a side reaction generated if the bulk metal oxide layer 11 contacts an electrolyte is prevented by blocking the electrolyte from contacting the bulk metal oxide layer 11, and elements of the bulk metal oxide layer 11 may be prevented from being eluted. Moreover, since a basic material used while preparing the surface-treated electrode active material 10 is not left on the surface metal oxide layer 12 (refer to FIG. 4), the surface-treated electrode active material 10 may show excellent charging and discharging characteristics and excellent lifetime characteristics at a high temperature. In the present specification, the term "elute or elution" denotes a phenomenon that an element of a bulk layer seeps from an electrode active material layer to an external surface.

Figure 2:
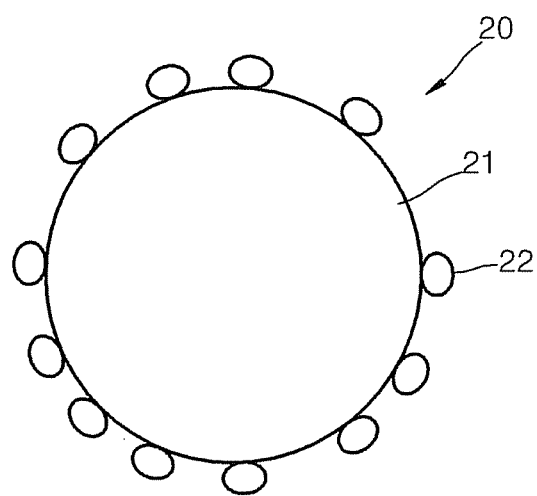
FIG. 2 is a cross-sectional view of a typical surface-coated electrode active material.

Unlike embodiments of the present invention, a surface-coated electrode active material 20 of FIG. 2 including a bulk metal oxide layer 21 and coating particles 22 formed on the bulk metal oxide layer 21 and derived from an inorganic material such as $AlF_3$ has been typically used. However, since the coating particles 22 are not disposed to completely cover the entire surface of the bulk metal oxide layer 21, but are disposed irregularly in an island form, the bulk metal oxide layer 21 is not completely prevented from contacting an electrolyte, and it is difficult to suppress elution of elements of the bulk metal oxide layer 21. Accordingly, in this case, a side reaction is generated as the bulk metal oxide layer 21 contacts the electrolyte, and the elements of the bulk metal oxide layer 21 are eluted.

The metal oxide M may be Mn. For example, if the metal oxide M is Mn, p is 4, and q is 3, $[M^{q+}/M^{p+}]_{bulk}$ may be from 0 to about 0.1 and $[M^{q+}/M^{p+}]_{surface}$ may be from about 0.1 to about 0.5.

A method of surface treating the electrode active material, according to an embodiment of the present invention, will now be described in detail. The method includes: forming a mixture by adding (i) an untreated electrode active material including a metal oxide, and (ii) at least one of a basic material and a reducing material to a solvent; and stirring the mixture. In the present specification, "stirring" not only denotes mechanical mixing, but also denotes all mixing operations obtaining the same or similar mixing effects as the mechanical mixing, such as thermal mixing, ultrasonic mixing, and natural mixing, for example, natural diffusion.

If the basic material is not included, the pH of the mixture after the stirring may be from about 2 to about 6 (acidic) or from about 7 to about 10 (basic). Here, if the pH of the mixture is within the above ranges, the reducing power of the reducing material may be further increased.

If the basic material and the reducing material are both included, the pH of the mixture after the stirring may be from about 8 to about 14. Here, if the pH of the mixture is within the above range, properties of the electrode active material may be stably maintained and the reducing power of the reducing material may be highly maintained.

If the reducing material is not included, the pH of the mixture after the stirring may be from about 8 to about 14. Here, if the pH of the mixture is within the above range, the properties of the electrode active material may be stably maintained and reducing power of the basic material may be highly maintained.

Alternatively, surface treating using the basic material and surface treating using the reducing material may be performed in the stated order or in the reverse order.

The untreated electrode active material and/or the metal oxide included in the untreated electrode active material may have substantially the same composition as the bulk metal oxide layer 11 described above.

The metal oxide may include Mn.

The basic material may include at least one compound selected from the group consisting of KOH, LiOH, NaOH, $Mg(OH)_2$, pyridine, ammonia, acetylacetone, and $Ba(OH)_2$.

The reducing material may include at least one compound selected from the group consisting of sodium amalgam, a sulfite compound, hydrazine, iron(II) sulfate, a Lindlar catalyst, $LiAlH_4$, hydrogen, ascorbic acid, oxalic acid, formic acid. $NaBH_4$, tin chloride, and phosphonic acid. The sulfite compound may include at least one type of compound selected from the group consisting of $Na_2SO_3$, $K_2SO_3$, $Li_2SO_3$, $MgSO_3$, and $CaSO_3$. For example, if ascorbic acid is used as the reducing material, the basic material may be used together.

The method may further include, after stirring, obtaining a solid body by filtering the mixture, cleaning the solid body, and drying the cleaned solid body.

A cleaning agent used during the cleaning may include at least one compound selected from the group consisting of water, ethanol, and acetone.

The drying may be performed at a temperature from about 20 to about 80° C. under a pressure less than atmospheric pressure, for example, from 0 to about 10 Torr.

An electrode including the surface-treated electrode active material will now be described in detail. In one embodiment, the electrode is a cathode for a lithium secondary battery, but alternatively, the electrode may be an anode for a lithium secondary battery, or a cathode or anode for another battery.

The electrode may further include a binder and a conducting agent, in addition to the surface-treated electrode active material. For example, the electrode includes a current collector and an electrode active material layer formed on the current collector, wherein the electrode active material layer may include the surface-treated electrode active material, the binder, and/or the conducting agent.

The binder satisfactorily adheres particles of the surface-treated electrode active material to each other, and also the surface-treated electrode active material to the current collector. Examples of the binder include polyvinyl alcohol, carboxymethyl cellulose, hydroxypropyl cellulose, diacetyl-cellulose, polyvinylchloride, carboxylated polyvinylchloride, polyvinyl fluoride, polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon, but are not limited thereto.

The conducting agent imparts conductivity to the electrode. The conducting agent may be natural graphite; artificial graphite; carbon black; acetylene black; carbon fiber; powdered metal such as copper, nickel, aluminum, or silver; or metal fiber; or may be a mixture of one or two types of conducting materials, such as polyphenylene derivatives.

The current collector may be an aluminum thin film, but is not limited thereto.

The electrode may be manufactured by preparing an electrode active material composition by mixing the surface-treated electrode active material, the binder, and/or the conducting agent in a solvent, and coating the electrode active material composition on the current collector. The solvent may be N-methylpyrrolidone, but is not limited thereto. Since a method of manufacturing an electrode is known in the related field, details thereof are not described herein.

A lithium secondary battery including the electrode will now be described. The lithium secondary battery includes a cathode, an anode, an electrolyte, and selectively a separator. The lithium secondary battery may include the electrode as a cathode, but alternatively, may include the electrode as an anode. If the lithium secondary battery includes the electrode as an anode, the electrode may include a surface-treated electrode active material having a partially different composition compared to the surface-treated electrode active material for a cathode.

The lithium secondary battery may further include the separator between the cathode and the anode. The separator may be a polyethylene film, a polypropylene film, a polyvinylidene fluoride film, or a multilayer film of at least two films thereof, or may be a mixed multilayer film, such as two layers of a polyethylene film and a polypropylene film, three layers of a polyethylene film, a polypropylene film, and a polyethylene film, or three layers of a polypropylene film, a polyethylene film, and a polypropylene film.

The electrolyte may be an organic liquid electrolyte or a solid electrolyte. The organic liquid electrolyte may be obtained by dissolving lithium salt in an organic solvent. The organic solvent may be selected from the group consisting of propylene carbonate (PC), ethylene carbonate (EC), fluoroethylene carbonate (FEC), butylene carbonate (BC), dimethyl carbonate (DMC), diethyl carbonate (DEC), ethyl methyl carbonate (EMC), methyl propyl carbonate (MPC), ethyl propyl carbonate (EPC), methyl isopropyl carbonate (MIPC), dipropyl carbonate (DPC), dibutylcarbonate (DBC), benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, and a composition thereof. The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, and a composition thereof. The solid electrolyte may be a boron oxide or a lithium oxynitride. The solid electrolyte may be formed on the cathode or anode by using a sputtering method.

The lithium secondary battery may be manufactured by, for example, sequentially stacking the cathode, the separator, and the anode to form a stacked structure, winding or folding the stacked structure and putting it in a circular or angular battery case, and then injecting the organic liquid electrolyte into the battery case.

Embodiments of the present invention will be described in greater detail with reference to the following examples. The following examples are for illustrative purposes only and are not intended to limit the scope of the invention.

Examples 1 Through 3

Preparation Example 1

Preparation of Surface-Treated Electrode Active Material

A mixed aqueous solution was prepared by using over-lithiated lithium transition metal oxide (OLO) powder ($Li_{1+x}(Mn,Ni,Co)_{1-x}O_2$, wherein 1+x=1.01 to 1.4) constituting an untreated electrode active material, and a basic material. Then, the mixed aqueous solution was stirred for 6 hours and filtered to obtain a solid body. Next, the solid body was cleaned with water and dried in an oven at 80° C. to obtain a surface-treated electrode active material. Types and molar densities of materials, and pH of mixed aqueous solutions used in Examples 1 through 3 are shown in Table 1 below.

TABLE 1

|  | Untreated Electrode Active material | Basic Material | | | Reducing Material | | pH of Mixed Aqueous Solution |
|---|---|---|---|---|---|---|---|
|  | OLO (mol/L) | KOH (mol/L) | NaOH (mol/L) | LiOH (mol/L) | $Na_2SO_3$ (mol/L) | Ascorbic Acid (mol/L) |  |
| Example 1 | 2 | 1.68 | 0 | 0 | 0 | 0 | 13.5 |
| Example 2 | 0.2 | 0 | 0.3 | 0 | 0 | 0 | 13 |
| Example 3 | 0.2 | 0 | 0 | 0.3 | 0 | 0 | 13 |

Preparation Example 2

Preparation of Lithium Secondary Battery

A conducting agent (acetylene black) and a binder solution (obtained by dissolving 5 wt % of polyvinylidene fluoride (PVdF) in N-methylpyrrolidone (NMP)) were satisfactorily mixed in an agate mortar, and then OLO powder was added to the agate mortar and mixed to prepare a slurry (OLO:acetylene black:PVdF=94:3:3 (weight ratio)). Then, the slurry was coated on an aluminum foil having a thickness of 15 μm via bar coating. The resultant product was put into an oven and firstly dried for about 2 hours at 90° C. so that NMP was evaporated, and then put into a vacuum oven and secondly dried for about 2 hours at 120° C. so that NMP was completely dried, and thus an electrode was obtained. Then, the electrode was pressed and punched to obtain a cathode for a coin cell, which has a thickness of 60 μm.

A coin cell, i.e., a lithium secondary battery, having a standard 2032 shape was prepared by using the cathode having a diameter of 1.5 cm, an Li metal anode having a diameter of 1.6 cm, and a polyethylene separator, wherein 1.3 M (mol/L) $LiPF_6$ EC/DEC/EMC (3/5/2 (volume ratio)) was used as an electrolyte.

Example 4

A surface-treated electrode active material was prepared in the same manner as in Examples 1 through 3, except that a mixed aqueous solution was prepared by using $Na_2SO_3$ as a reducing material, instead of the basic material. Also, a lithium secondary battery was prepared in the same manner as in Examples 1 through 3. Types and molar densities of materials, and pH of the mixed aqueous solution used in Example 4 are shown in Table 2 below.

TABLE 2

| | Untreated Electrode Active Material, OLO (mol/L) | Reducing Material, $Na_2SO_3$ (mol/L) | pH of Mixed Aqueous Solution |
|---|---|---|---|
| Example 4 | 0.2 | 0.1 | 9.4 |

Examples 5 and 6

A surface-treated electrode active material was prepared in the same manner as in Examples 1 through 3, except that a mixed aqueous solution was prepared by additionally using a reducing material along with KOH constituting the basic material. Here, an aqueous solution of an electrode active material was first prepared by adding the untreated electrode active material and KOH to water, and an aqueous solution of a reducing material was prepared separately from the aqueous solution of the electrode active material, and the mixed aqueous solution was prepared by dropwise adding the aqueous solution of the reducing material to the aqueous solution of the electrode active material. Also, a lithium secondary battery was prepared in the same manner as in Examples 1 through 3. Types and molar densities of materials, and pH of the mixed aqueous solutions used in Examples 5 and 6 are shown in Table 3 below.

TABLE 3

| | Aqueous Solution of Electrode Active Material | | Aqueous Solution of Reducing Material | | pH of Mixed Aqueous Solution |
|---|---|---|---|---|---|
| | Untreated Electrode Active Material | Basic Material | Reducing Material | Reducing Material | |
| | OLO (mol/L) | KOH (mol/L) | $Na_2SO_3$ (mol/L) | Ascorbic Acid (mol/L) | |
| Example 5 | 0.2 | 0.3 | 0.1 | 0 | 13 |
| Example 6 | 0.2 | 0.3 | 0 | 0.1 | 13 |

Example 7

A surface-treated electrode active material was prepared in the same manner as in Examples 1 through 3, except that a mixed aqueous solution was prepared by using NCM ($Li(Ni_{0.33}CO_{0.33}Mn_{0.33})O_2$) instead of OLO. Also, a lithium secondary battery was prepared in the same manner as in Examples 1 through 3. Types and molar densities of materials, and pH of the mixed aqueous solution used in Example 7 are shown in Table 4 below.

TABLE 4

| | Untreated Electrode Active Material, NCM (mol/L) | Basic Material, KOH (mol/L) | pH of Mixed Aqueous Solution |
|---|---|---|---|
| Example 7 | 0.2 | 0.3 | 13 |

Comparative Example 1

Untreated OLO was used as an electrode active material for a cathode, instead of the surface-treated electrode active material prepared in Examples 1 through 3. Also, a lithium secondary battery was prepared in the same manner as in Examples 1 through 3.

Comparative Example 2

Untreated NCM was used as an electrode active material for a cathode, instead of the surface-treated electrode active material prepared in Examples 1 through 3. Also, a lithium secondary battery was prepared in the same manner as in Examples 1 through 3.

Evaluation Example 1

Evaluation on Lifetime Characteristics

Charging and discharging tests were performed on the coin cells prepared in Examples 1 through 3 and Comparative Example 1, according to the method below by using a charging and discharging device (Toyo, TOSCAT-2100 cycler). First, formation charging and discharging was performed twice on the coin cells of Examples 1 through 3 and Comparative Example 1 at room temperature of 25° C. In the first formation operation, constant current charging was performed until the voltage reached 4.6 V (referred to as the charging voltage) at a current of 0.05 C. and constant current discharging was performed until the voltage reached 2.8 V at a current of 0.05 C. In the second formation operation, constant current charging was performed until the voltage reached 4.6 V at a current of 0.1 C. constant current charging was performed until the current reached 0.05 C at a voltage of 4.6 V, and then constant current discharging was performed until the voltage reached 2.8 V at a current of 0.1 C.

Figure 3:
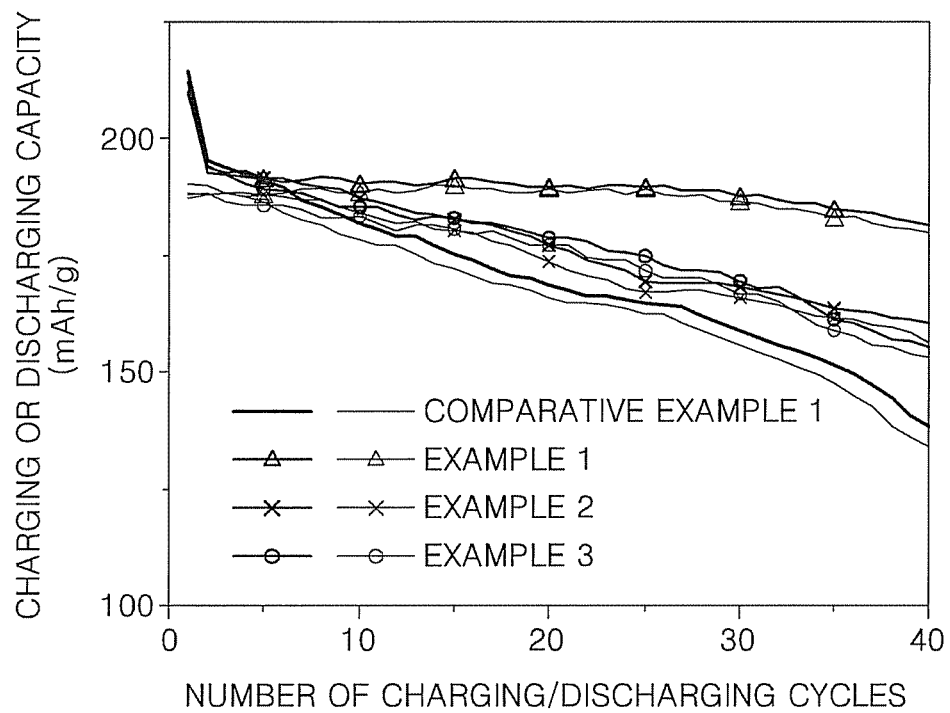
FIG. 3 is a graph showing lifetime characteristics of lithium secondary batteries manufactured according to Examples 1 through 3 and Comparative Example 1 as capacities with respect to the number of charging and discharging cycles.

After the formation charging and discharging, the coin cells were charged until the voltage reached 4.6 V at a current of 0.5 C, and then discharged until the voltage reached 2.8 V at a current of 0.2 C. at 60° C. Then, the coin cells were charged until the voltage reached 4.6 V at a current of 1 C. and then discharged until the voltage reached 2.8 V at a current of 1 C. which is referred to as a first charging and discharging cycle. Next, the charging and discharging cycle was repeated in the same conditions as the first charging and discharging cycle to measure charging capacity and discharging capacity in each charging and discharging cycle. Also, FIG. 3 shows the changes of the charging and discharging capacities with respect to the number of charging and discharging cycles. The charging capacities are shown as a thick line and the discharging capacities are shown as a thin line in each charging and discharging cycle. Referring to FIG. 3, lifetime characteristics of the coin cells of Examples 1 through 3 at a high temperature are excellent compared to that of Comparative Example 1.

Evaluation Example 2

Analysis on Surface Elements of Electrode Active Material

Figure 4:
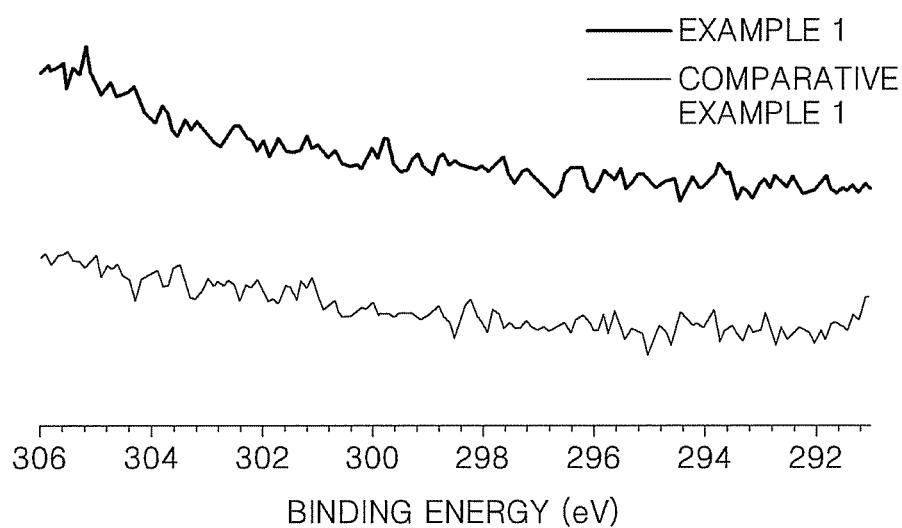
FIG. 4 are the X-ray photoelectron spectroscopy (XPS) spectrums of surface-treated electrode active materials manufactured in Example 1 and Comparative Example 1.

FIG. 4 shows X-ray photoelectron spectroscopy (XPS) spectrums obtained by analyzing surface elements of the surface-treated electrode active material of Example 1 and untreated electrode active material of Comparative Example 1 by using XPS. The XPS spectrum of the surface-treated electrode active material of Example 1 is very similar to the XPS spectrum of the untreated electrode active material of Comparative Example 1, and thus it was determined that an element induced from KOH constituting a basic material does not exist on the surface-treated electrode active material of Example 1. In detail, peaks (292.7 eV (KCl), 294.5 eV (K metal), etc.) induced from KOH constituting the basic material do not exist in the two XPS spectrums.

Evaluation Example 3

Evaluation on Lifetime Characteristics

The charging and discharging tests were performed in the same manner as in Evaluation Example 1 to measure discharging capacity in each cycle, except that the coin cells prepared in Example 4 and Comparative Example 1 were used and the charging voltage was 4.3 V. Then, a capacity retention ratio was calculated according to Equation 1 below based on the discharging capacity in each cycle and discharging capacity in second cycle, in each coin cell, where results of the calculated capacity retention ratio are shown in FIG. 5.

$$\text{Capacity Retention Ratio (\%)} = \text{Discharging Capacity in } m\text{-th Cycle/Discharging Capacity in 2nd Cycle} \times 100 \quad [\text{Equation 1}]$$

Here, m is an integer of 2 or above.

Figure 5:
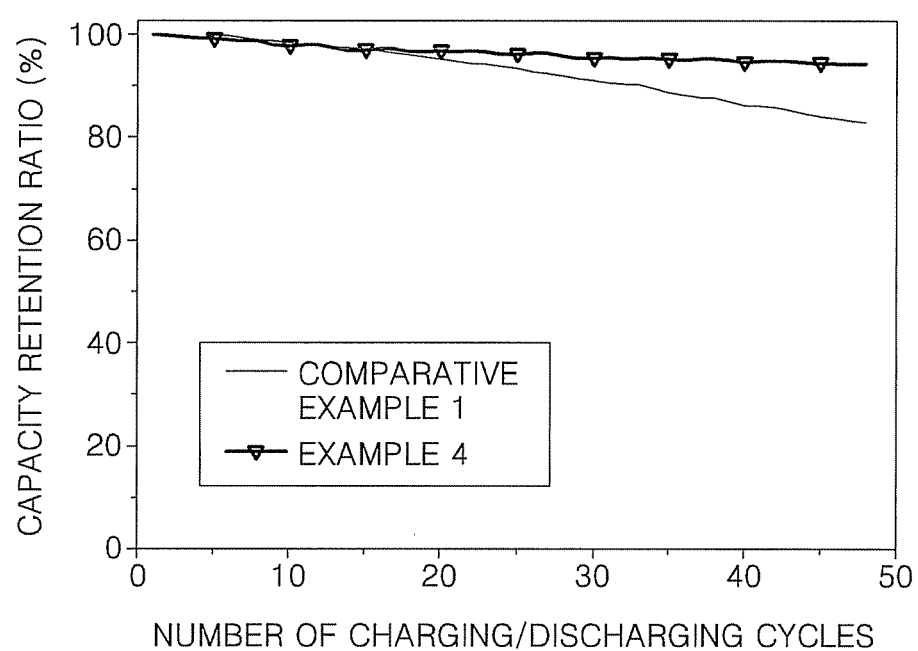
FIG. 5 is a graph showing lifetime characteristics of lithium secondary batteries manufactured according to Example 4 and Comparative Example 1 as capacity retention ratios with respect to the number of charging and discharging cycles.

Referring to FIG. 5, the lifetime of the coin cell of Example 4 at a high temperature is excellent compared to that of Comparative Example 1.

Evaluation Example 4

Evaluation on Lifetime Characteristics

Figure 6:
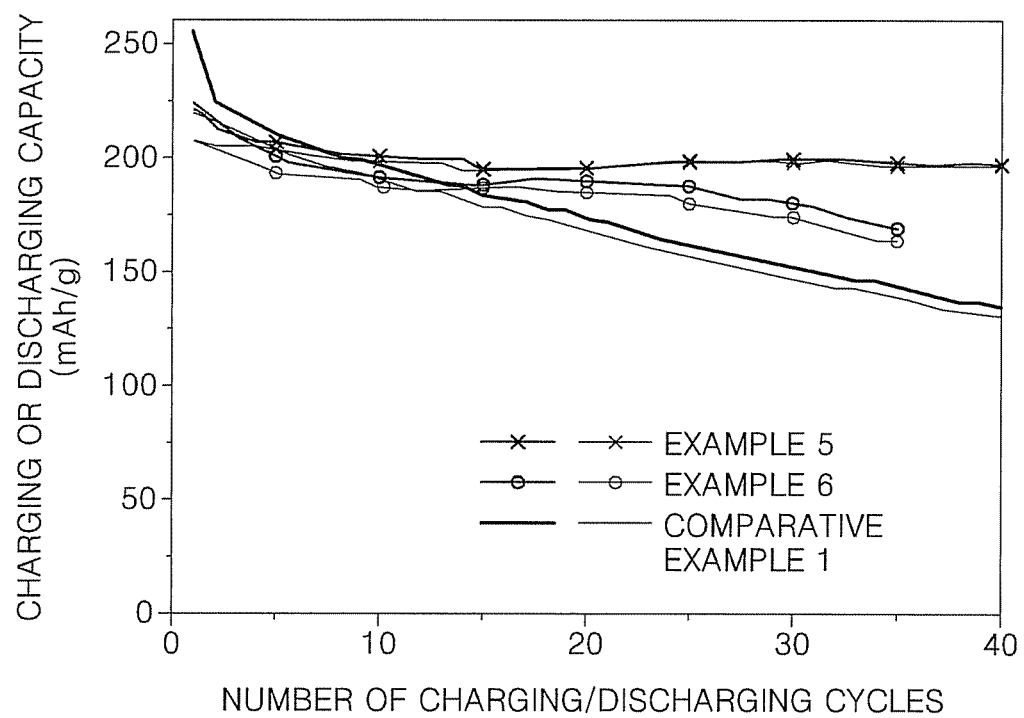
FIG. 6 is a graph showing lifetime characteristics of lithium secondary batteries manufactured according to Examples 5 and 6 and Comparative Example 1 as capacities with respect to the number of charging and discharging cycles.

The charging and discharging tests were performed in the same manner as in Evaluation Example 1 to measure discharging capacity in each cycle, except that the coin cells prepared in Examples 5 and 6 and Comparative Example 1 were used and the charging voltage was 4.8 V. FIG. 6 shows the changes of the discharging capacity with respect to the number of charging and discharging cycles. In each charging and discharging cycle, charging capacity is shown as a thick line, and discharging capacity is shown as a thin line. Referring to FIG. 6, it is determined that lifetime characteristics of the coin cells of Examples 5 and 6 at a high temperature are excellent compared to that of Comparative Example 1.

Evaluation Example 5

Evaluation on Lifetime Characteristics

The charging and discharging tests were performed in the same manner as in Evaluation Example 1 to measure charging capacity and discharging capacity in each cycle, except that the coin cells prepared in Examples 5 and 6 and Comparative Example 1 were used and the charging voltage was 4.8 V. Then, cycle efficiency was calculated according to Equation 2 below based on the charging and discharging capacities in each cycle, in each coin cell, where results of the calculated cycle efficiency are shown in FIG. 7.

$$\text{Cycle Efficiency (\%)} = \text{Discharging Capacity in } m\text{-th Cycle/Charging Capacity in } m\text{-th Cycle} \times 100 \quad [\text{Equation 2}]$$

Here, m is an integer of 1 or above.

Figure 7:
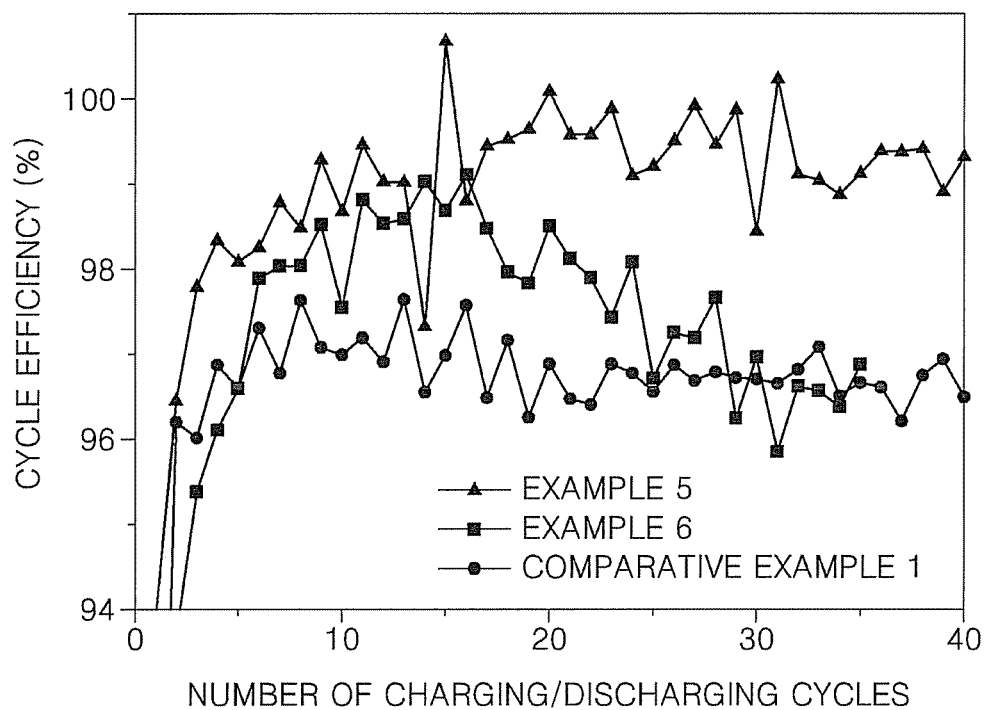
FIG. 7 is a graph showing lifetime characteristics of lithium secondary batteries manufactured according to Examples 5 and 6 and Comparative Example 1 as cycle efficiencies with respect to the number of charging and discharging cycles.

Referring to FIG. 7, lifetimes of the coin cells of Examples 5 and 6 at a high temperature are generally excellent compared to that of Comparative Example 1.

Evaluation Example 6

Evaluation on Lifetime Characteristics

Figure 8:
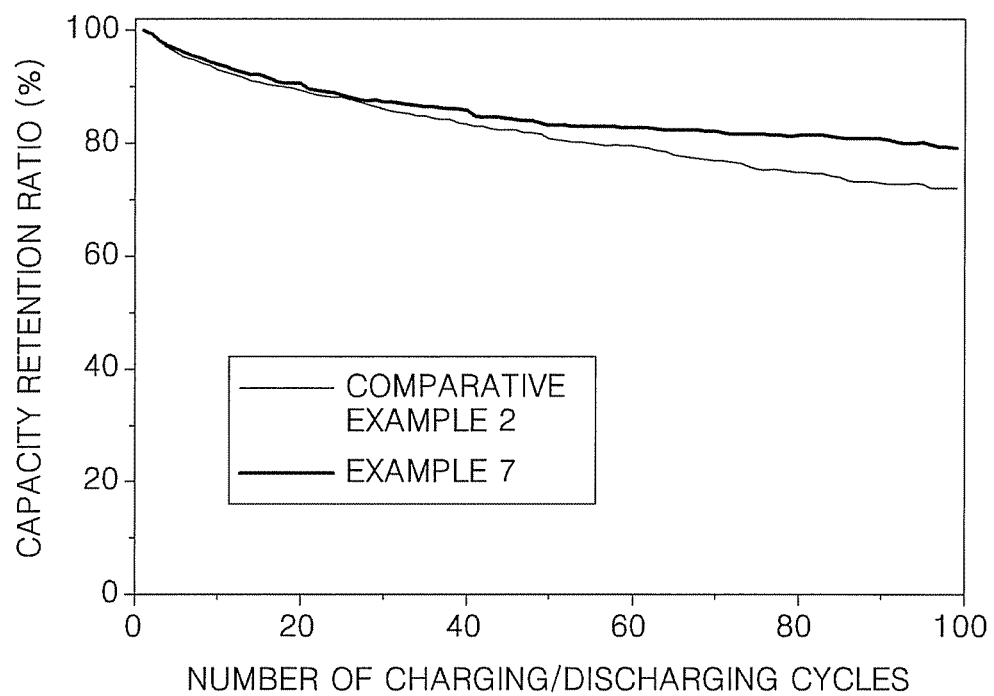
FIG. 8 is a graph showing lifetime characteristics of lithium secondary batteries manufactured according to Example 7 and Comparative Example 2 as capacity retention ratios with respect to the number of charging and discharging cycles.

The charging and discharging tests were performed in the same manner as in Evaluation Example 1 to measure discharging capacity in each cycle, except that the coin cells prepared in Example 7 and Comparative Example 2 were used and the charging voltage was 4.3 V. Then, a capacity retention ratio was calculated according to Equation 1 based on the discharging capacity in each cycle and discharging capacity in the second cycle, in each coin cell, where results of the calculated capacity retention ratio are shown in FIG. 8. Referring to FIG. 8, the lifetime of the coin cell of Example 7 at a high temperature is excellent compared to that of Comparative Example 2.

Evaluation Example 7

Evaluation on Lifetime Characteristics

Figure 9:
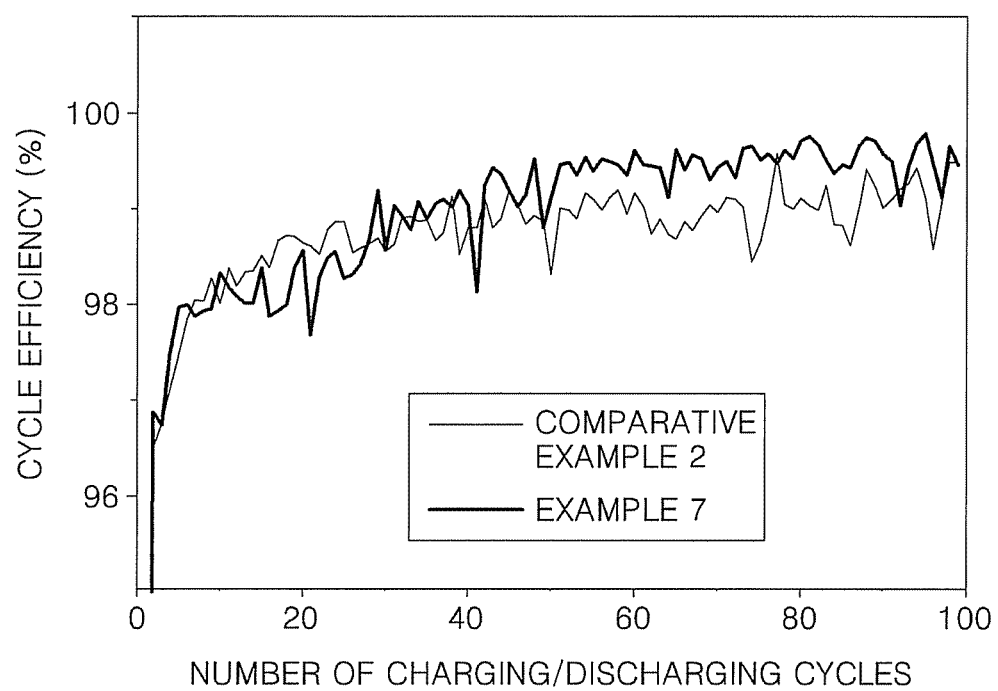
FIG. 9 is a graph showing lifetime characteristics of lithium secondary batteries manufactured according to Example 7 and Comparative Example 2 as cycle efficiencies with respect to the number of charging and discharging cycles.

The charging and discharging tests were performed in the same manner as in Evaluation Example 1 to measure charging capacity and discharging capacity in each cycle, except that the coin cells prepared in Example 7 and Comparative Example 2 were used and the charging voltage was 4.3 V. Then, cycle efficiency was calculated according to Equation 2 based on the charging and discharging capacities in each cycle, in each coin cell, where results of the calculated cycle efficiency are shown in FIG. 9. Referring to FIG. 9, the lifetime of the coin cell of Example 7 at a high temperature is generally excellent compared to that of Comparative Example 2.

Evaluation Example 8

Evaluation on Surface Characteristics of Electrode Active Material

Figure 10:
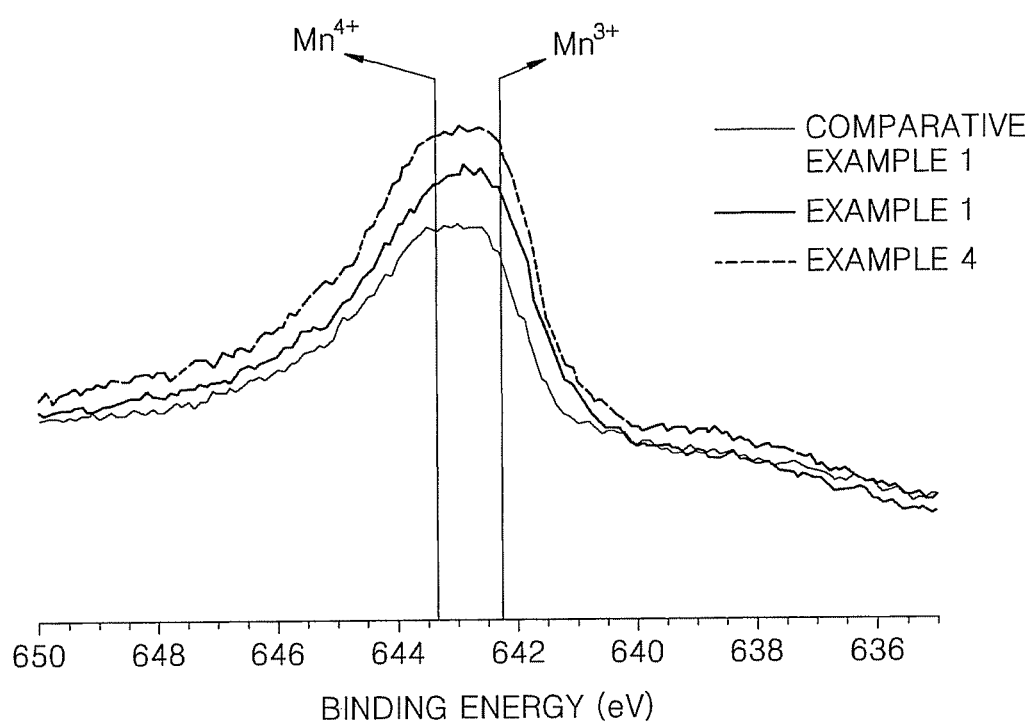
FIG. 10 is the XPS spectrum of electrode active materials manufactured according to Examples 1 and 4 and Comparative Example 1.

FIG. 10 shows XPS spectrums obtained by analyzing surface characteristics, i.e., degrees of reduction of surface Mn elements, of the surface-treated electrode active materials of Examples 1 and 4, and the untreated electrode active material of Comparative Example 1 by using XPS. Also, Table 5 below shows the degrees of reduction ($Mn^{3+}/Mn^{4+}$) of the surface Mn elements of the electrode active materials of Examples 1 and 4 and Comparative Example 1, calculated from the XPS spectrums.

TABLE 5

| | Example 1 | Example 4 | Comparative Example 1 |
|---|---|---|---|
| Degree of reduction ($Mn^{3+}/Mn^{4+}$) | 0.11 | 0.08 | 0.05 |

Referring to Table 5 and FIG. 10, the degrees of reduction of the surface Mn elements of the surface-treated electrode active materials of Examples 1 and 4 are higher than that of Comparative Example 1.

As described above, according to the one or more of the above embodiments of the present invention, cell characteristics, specifically lifetime characteristics at a high temperature of the surface-treated electrode active material, can be improved. As such, as the lifetime characteristics at a high temperature are improved, the lithium secondary battery employing the surface-treated electrode active material may operate in a harsh environment usually generated when used in electric vehicles and/or power storage devices because side reactions of the electrolyte or elution of the electrode active material accompanied by high temperatures or high voltages is satisfactorily suppressed on the surface of the electrode active material modified via the surface treatment. The method of surface treating the electrode active material, according to the embodiments of the present invention, can be applied to manufacturing of an ultra-high voltage cathode active material (for example, 5 V spinel, high voltage phosphate), and can expand to manufacturing of an oxide used for an anode, and thus, can improve energy density of batteries for electric vehicles and/or power storage devices.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A surface-treated electrode active material comprising:
   a bulk metal oxide layer comprising n species of metal elements, wherein n is a natural number of 2 or above; and
   a surface metal oxide layer comprising the same species of metal elements as those of the bulk metal oxide layer,
   wherein the degree of reduction [Mq+/Mp+]surface, wherein M is a metal element, and p and q are respectively an integer equal to or higher than 0 and p>q, of a metal element included in the surface metal oxide layer is higher than the degree of reduction [Mq+/Mp+] bulk,
   wherein M is a metal element, and p and q are respectively an integer equal to or higher than 0 and p>q, of a corresponding metal element included in the bulk metal oxide layer,
   wherein, when M is Mn, p is 4 and q is 3, [Mq+/Mp+]bulk is from 0 to about 0.1 and [Mq+/Mp+]surface is from about 0.1 to about 0.5,
   wherein [Mq+/Mp+]surface and [Mq+/Mp+]bulk are determined by X-ray photoelectron spectroscopy, and
   wherein the surface metal oxide layer completely surrounds the bulk metal oxide layer.

2. The surface-treated electrode active material of claim 1, being a cathode active material or an anode active material, for a battery.

3. The surface-treated electrode active material of claim 2, wherein the battery is a lithium secondary battery.

4. The surface-treated electrode active material of claim 3, being a cathode active material.

5. The surface-treated electrode active material of claim 3, being an anode active material.

6. A method of surface treating an electrode active material, the method comprising:
   forming a mixture by adding an untreated electrode active material comprising a metal oxide, and at least one of a basic material and a reducing material to a solvent; and
   stirring the mixture to treat the surface of an electrode active material and form a surface-treated electrode active material,
   wherein the surface-treated electrode active material comprises
   a bulk metal oxide layer comprising n species of metal elements, wherein n is a natural number of 2 or above, and
   a surface metal oxide layer comprising the same n species of metal elements as those of the bulk metal oxide layer,
   wherein the degree of reduction [Mq+/Mp+]surface, wherein M is a metal element, and p and q are respectively an integer equal to or higher than 0 and p>q, of a metal element included in the surface metal oxide layer is higher than the degree of reduction [Mq+/Mp+] bulk, wherein M is a metal element, and p and q are respectively an integer equal to or higher than 0 and p>q, of a corresponding metal element included in the bulk metal oxide layer,
   wherein, when M is Mn, p is 4 and q is 3, [Mq+/Mp+]bulk is from 0 to about 0.1 and [Mq+/Mp+]surface is from about 0.1 to about 0.5,
   wherein [Mq+/Mp+]surface and [Mq+/Mp+]bulk are determined by X-ray photoelectron spectroscopy, and
   wherein the surface metal oxide layer completely surrounds the bulk metal oxide layer.

7. The method of claim 6, wherein, if the basic material is not added to the mixture, the pH of the mixture after the stirring is from about 2 to about 6, i.e., acidic, or from about 7 to about 10, i.e., basic.

8. The method of claim 6, wherein, if both the basic material and the reducing material are added to the mixture, the pH of the mixture after the stirring is from about 8 to about 14.

9. The method of claim 6, wherein, if the reducing material is not added to the mixture, the pH of the mixture after the stirring is from about 8 to about 14.

10. The method of claim 6, wherein the metal oxide comprises manganese (Mn).

11. The method of claim 6, wherein the basic material is at least one type of compound selected from the group consisting of KOH, LiOH, NaOH, Mg(OH)$_2$, pyridine, ammonia, acetylacetone, and Ba(OH)$_2$.

12. The method of claim 6, wherein the reducing material is at least one type of compound selected from the group consisting of sodium amalgam, a sulfite compound, hydrazine, iron(II) sulfate, a Lindlar catalyst, LiAlH$_4$, hydrogen, ascorbic acid, oxalic acid, formic acid, NaBH$_4$, tin chloride, and phosphonic acid.

13. The method of claim 6, further comprising, after the stirring, obtaining a solid body by filtering the mixture, cleaning the solid body, and drying the cleaned solid body.

14. The method of claim 13, wherein the drying is performed at a temperature from about 20 to about 80° C. under a pressure below atmospheric pressure.

15. The method of claim 14, wherein the atmospheric pressure is from 0 to about 10 Torr.

16. An electrode comprising the surface-treated electrode active material of claim 1.

17. A lithium secondary battery comprising the electrode of claim 16.

18. The lithium secondary battery of claim 17, wherein the electrode is a cathode.

* * * * *